Patented Nov. 15, 1949

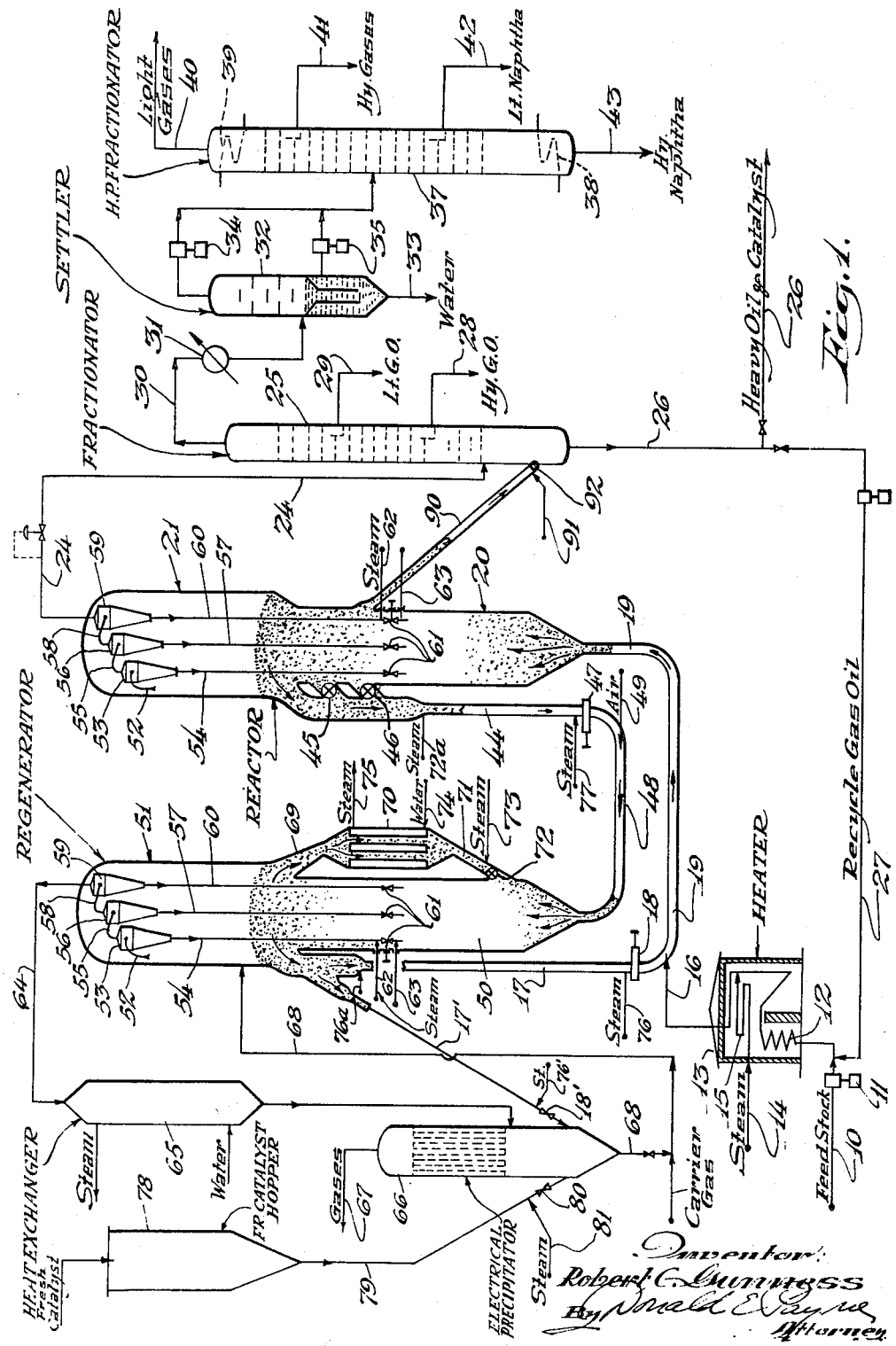

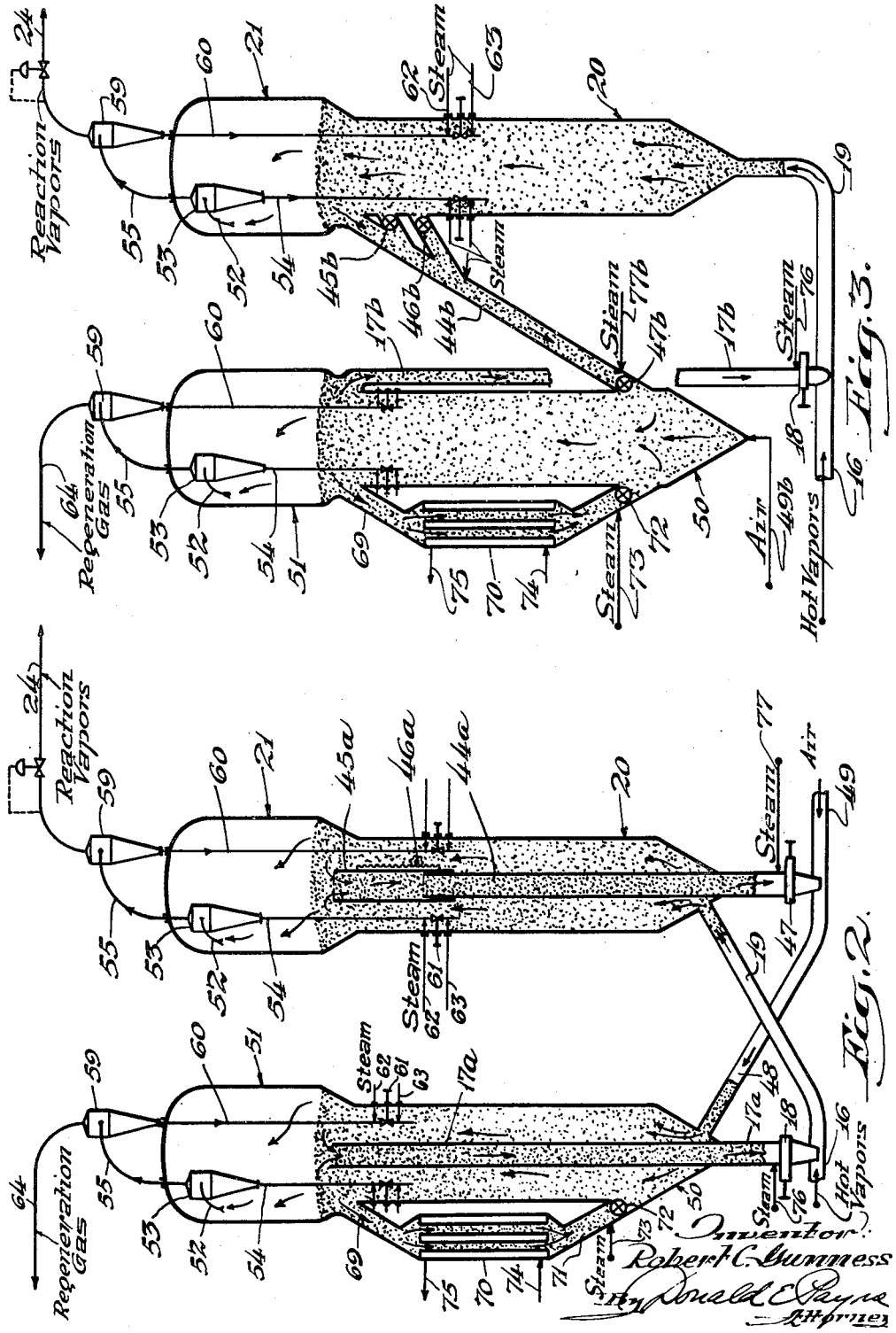

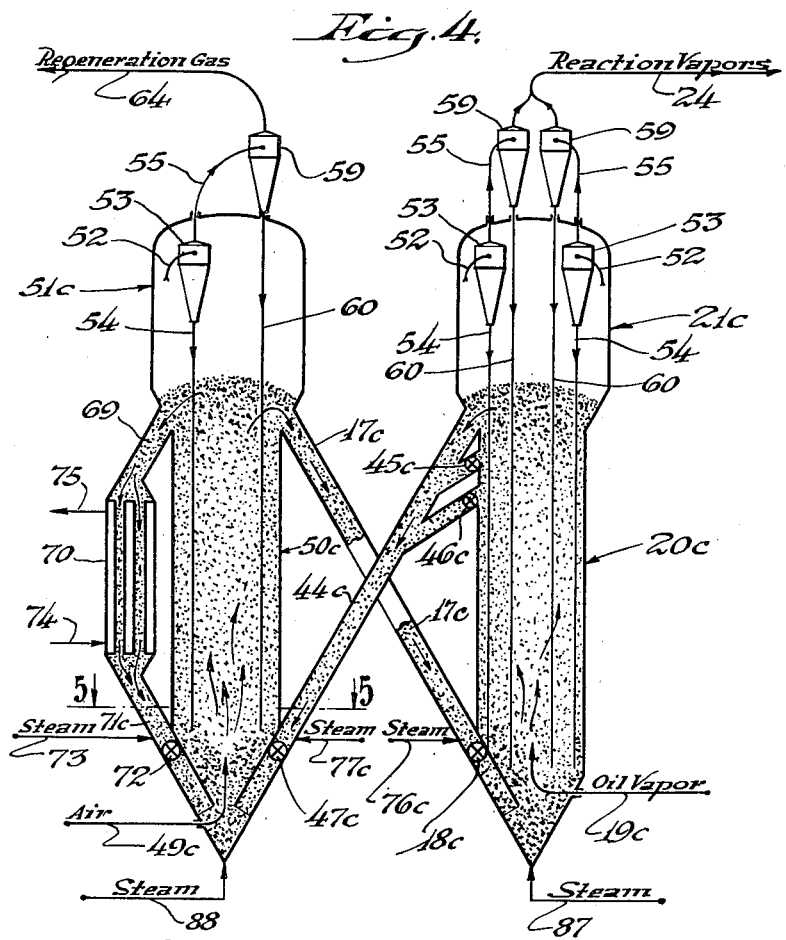
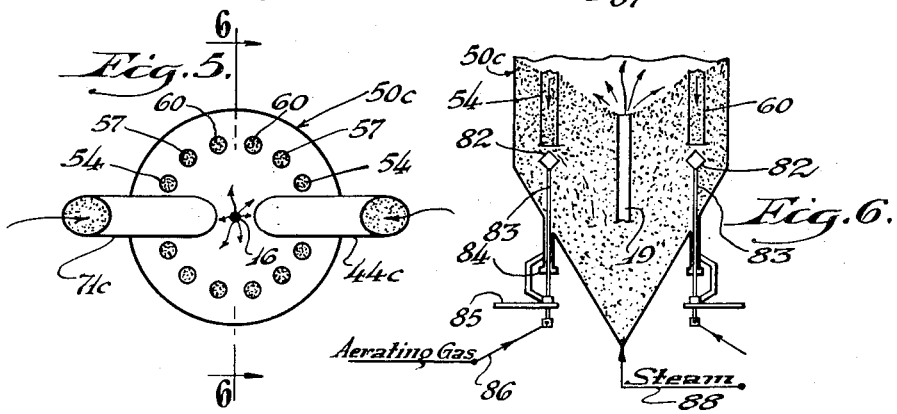

2,488,031

UNITED STATES PATENT OFFICE 2,488,031

CATALYTIC CONVERSION SYSTEM

Robert C. Gunness, Chicago, Ill., assignor to Standard Oil Company, Chicago, Ill., a corporation of Indiana Application July 3, 1941, Serial No. 400,958

14 Claims. (Cl. 196—52)

This invention relates to a catalytic hydrocarbon conversion system and it pertains more particularly to improvements in a powdered or fluid-type catalytic conversion system. This application is a continuation-in-part of my copending application Serial No. 390,202 filed April 24, 1941, which issued as Patent No. 2,377,935 on June 12, 1945.

Certain of the features of apparatus and operation herein set forth are separately described and claimed in the following applications: Page Ser. No. 376,763, filed January 31, 1941; Scheineman Ser. No. 392,848, filed May 10, 1941; and Scheineman Ser. No. 400,956, filed July 3, 1942. Related applications include Johnson Ser. Nos. 392,846-7, both filed May 10, 1941, and Scheineman Ser. No. 440,566, filed April 27, 1942.

In the powdered or fluid-type catalyst system a powdered catalyst effects a conversion while suspended in a hydrocarbon vapor stream. It is then separated from the hydrocarbon vapors and suspended in a gas mixture for regeneration. Regenerated catalyst is then separated from regeneration gases and resuspended in the hydrocarbon vapor stream for effecting further conversion.

A serious problem in the operation of this fluid catalyst system is that of effecting complete separation of catalyst particles from reaction vapors and from regeneration gases respectively. If appreciable amounts of catalyst are lost with regenerator gases, that catalyst will have to be replaced. Even if losses are reduced to one-tenth of one percent of the circulating catalyst the replacement expense is enormous because of the extremely large volume of catalyst that is circulated. An object of my invention is to reduce the catalyst losses for a conversion system to less than .01%. A further object is to reduce the cost of the catalyst recovery system and to simplify the operation thereof. A further object is to eliminate pressure surge with its incident catalyst carry-over in catalyst separation systems.

An important object of my invention is to provide a method and means for insuring that the desired amount of catalyst material will be retained in reactors regardless of variations in the rate at which catalyst is being introduced into the reactor and regardless of pressure surges or other phenomena that might tend to change the level of the dense turbulent suspended catalyst phase therein. A further object is to provide a means for withdrawing catalyst from a reactor which will not only avoid any tendency toward surging, but will actually insure the maintenance of the dense turbulent suspended catalyst phase at the desired level. A further object is to provide improved methods and means for transferring dense phase catalyst from one zone to another, stripping the catalyst during transfer and injecting the stripped catalyst into the same or a different dense phase without the catalyst at any time passing into a light dispersed phase.

A further object of the invention is to provide improved methods and means for knocking back catalyst from a light dispersed phase into a dense turbulent suspended catalyst phase. A further object is to provide improved methods and means for introducing dense phase catalyst into a dense phase aerated or turbulent catalyst zone while restricting or preventing the flow of gases or vapors through the dense phase catalyst inlet conduit. A further object is to provide improved methods and means for sealing a catalyst inlet conduit against any undesirable back flow of gases or vapors therethrough.

A further object of my invention is to provide an improved side-by-side reactor system and improved methods and means for transferring catalyst from the top of each reactor to the bottom of the other reactor. A further object is to provide an improved arrangement of standpipes inside or outside of the reactors. A further object is to provide improved catalyst cooling means.

In order to effect temperature control, particularly in regeneration systems, it has been proposed to cool a portion of the regenerated catalyst and to recycle this cooled regenerated catalyst along with spent catalyst at the base of a regeneration chamber so that enough heat may be absorbed by the relatively cooler regenerated catalyst to keep the temperature from rising above safe limits from the standpoint of catalyst activity, e.g., from exceeding about 1050 or 1100° F. In a 10,000 barrel per day plant employing about 600,000 to 650,000 pounds of regenerated catalyst per hour it may be necessary to recycle about 1,500,000 to 2,000,000 pounds per hour of regenerated catalyst. The heat exchanger for cooling this enormous quantity of recycled catalyst should be designed for substantially vertical catalyst flow and in order to insure the desired flow of catalyst solids through this exchanger it has heretofore been considered necessary to carry the catalyst upwardly through the exchanger in a suspending gas.

If the cooler is mounted alongside the regenerator and the suspended catalyst is returned to the upper part of the regenerator, the suspending gas by-passes the lower part of the regenerator and places an undue load on the catalyst recovery system without serving to support combustion in the lower part of the regenerator. It has, therefore, been considered necessary to mount the cooler below the level of the regenerator so that the cooled recycled suspension might be introduced at the base of the regenerator. By mounting the cooler below the level of the regenerator the overall height of the equipment may be increased by as much as fifty feet, i. e., from about 150 feet to 200 feet or more. The cost of constructing and operating a structure of such enormous height is one of the most serious problems which has been encountered in the fluid-type catalyst system. An object of my invention is to provide a method and means whereby the regeneration system may be materially decreased in height, thus providing enormous savings in construction and operation costs. A further object is to provide a system wherein recycled catalyst may be cooled at a point above the catalyst inlet to the regenerator. A further object is to simplify and decrease the cost of a system for cooling regenerated catalyst and returning said cooled catalyst to the regenerator. Other objects of the invention will be apparent as the detailed description thereof proceeds.

In practicing my invention I design my reactors so that the upflowing gases or vapors therein will produce a dense turbulent suspended catalyst phase in the main part of the reactor and a light dispersed catalyst phase in the top of the reactor. I withdraw catalyst from the reactor directly from the dense turbulent suspended catalyst phase, preferably at a point adjacent the upper level of said phase so that the drawoff line is in effect an overflow pipe. A feature of this dense phase withdrawal system is that catalyst may be simultaneously aerated and stripped in the overflow pipe and then returned to the lower part of another reactor while still in dense phase or after being dispersed in gases or vapors.

In order to prevent catalyst from leaving the top of the reactor with gases or vapors I provide a catalyst knock-back system at the top of the reactor and either on the inside or the outside of the reactor, or both. My preferred knock-back system comprises a plurality of cyclone separators which are preferably arranged in stages which may be either mounted inside the reactor or outside of the reactor. The catalyst which is separated from exit gases or vapors in these cyclones is returned to the dense turbulent suspended catalyst phase in the reactor. Preferably the dip legs from the cyclone extend substantially vertically to a point below the level of the dense turbulent suspended catalyst phase. However, two or more of the cyclones may discharge catalyst into a separate receiver and the catalyst may be returned from this receiver to the dense turbulent suspended catalyst phase. While I prefer to return this separated catalyst in dense phase condition it should be understood that the catalyst may be injected from the dip legs or from a collector or standpipe into the dense turbulent suspended catalyst phase by means of an injecting gas.

By placing these centrifugal separators inside the enlarged settling zone I effect marked economies in construction costs not only because of the extra piping and supports that would be required for external mounting but because relatively thin walled centrifugal separators can be used; if the centrifugal separators were outside the settling chamber they would have to withstand full operating pressure but when they are mounted inside the settling chamber they need only withstand a pressure of about 1 or 2 pounds per square inch. By mounting the centrifugal separators inside the settling zone the dip legs for returning separated catalyst do not have to pass through a chamber wall but may simply extend vertically into a dense or aerated mass of catalyst in the reaction or regeneration zone or in the enlarged settling zone.

I insure the return of separated catalyst through these dip legs and prevent gas blow-back therethrough by having their lower ends well below the surface of settled or dense phase catalyst. I establish the head of catalyst in each dip leg by means of an externally operated valve (which is open during normal operation) and I provide means above and below this valve for introducing steam so that if any dip leg becomes plugged, its proper function may be restored without shutting down the system. I prefer to employ a series of centrifugal separators in the top of the settling zone so that gases or vapors pass through one or more primary separators, then through one or more secondary separators, then through one or more tertiary separators, etc. before they are finally discharged from the catalyst hopper or settling chamber. I also prefer to employ a geometrical arrangement of such separators in the settling space which will give maximum catalyst recovery in a minimum amount of space.

For effecting temperature control in the regenerator I employ a gravity syphon system which consists simply of a conduit for withdrawing catalyst from an upper dense phase, a tubular heat exchanger, a conduit for returning catalyst directly into the lower part of the regenerator and a means for either controlling the rate of heat transfer to the cooling fluid in the heat exchanger or controlling the rate of flow of powdered catalyst therethrough or both.

The average density of catalyst in the regenerator may be about 15 to 18 pounds per cubic foot. When this catalyst is removed from the upwardly flowing gases or vapors and subjected only to mild aeration its density may be increased by about 1 to 20, for example about 5 or 10, pounds per cubic foot. This denser aerated catalyst still maintains its liquid-like flow characteristics. In practicing my invention I utilize this difference between the density of catalyst in the regenerator and the density of mildly aerated catalyst for effecting a gravity flow of separated catalyst through a vertical heat exchanger and back to the lower part of the regenerator.

The cooled catalyst may be introduced either upwardly or downwardly at the base of the regenerator and the gas which is employed for resuspending this catalyst in the regenerator may serve to support combustion in the lower as well as in the upper part of the regenerator chamber. Thus it will be seen that I have avoided the necessity of employing an up-flow catalyst cooler. I have avoided the enormous expense that would be involved in building the entire regenerator and catalyst separation means above the level of the catalyst cooler. I have provided a temperature control system of remarkable simplicity.

In addition to the catalyst knock-back system, the dense phase stripping and transfer system and improved cooling systems, my invention contemplates an improved standpipe arrangement and an improved side-by-side reactor system wherein the level of the dense turbulent suspended catalyst phase in one reactor may be controlled by a variable level catalyst draw-off and wherein the level in the other reactor may be controlled by catalyst inventory. These and many other features of my invention will be more clearly understood from the following detailed description read in conjunction with the accompanying drawings which form a part of this specification, in which similar parts are designated by like reference characters throughout the several views, and in which:

Figure 1 is a schematic flow diagram of my improved conversion and regeneration system;

Figure 2 is a schematic vertical section of a modified reactor regenerator system with centrally disposed internal standpipes;

Figure 3 is a schematic vertical section of a third modification illustrating external standpipes and direct transfer from a dense catalyst phase at the top of one zone to a dense catalyst phase in the lower part of another zone;

Figure 4 is a schematic vertical section of a fourth modification illustrating direct dense phase transfer from the top of each dense phase turbulent suspended catalyst zone to dense phase aerated catalyst in another zone;

Figure 5 is a horizontal section taken along the lines 5—5 of Figure 4; and

Figure 6 is a vertical section taken along the line 6—6 of Figure 5.

While the invention is applicable to a wide variety of hydrocarbon conversion processes such as isomerization, desulfurization, polymerization, reforming, isoforming, alkylation, gas reversion, hydrogenation, dehydrogenation, etc., it is particularly applicable to the catalytic cracking of gas oils and heavier hydrocarbons. The charging stock may consist of or may contain hydrocarbons produced by other conversion processes such as cracking or coking, hydrocarbons synthetically produced by the hydrogenation of carbonaceous materials, or hydrocarbons produced by a carbon monoxide-hydrogen synthesis (the so-called Fischer process). In my preferred embodiment I will describe the invention as applied to a 10,000 barrel per day catalytic cracking plant in which the charge may be Mid-Continent gas oil or may be three parts of virgin gas oil and one part of coke still distillate.

The gas oil feed stock from line 10 is forced by pump 11 into coils 12 of pipe still 13. (Suitable heat exchangers, or preheaters may be employed with liquids or vapors in various parts of the system but the present invention will be more clearly understood and the drawings will be less confused if such heat exchangers and similar engineering details are not specifically described.) The gas oil is vaporized in coils 12 and heated to a transfer line temperature of about 800 to 1050° F., for example about 900° F. to 925° F., at a pressure of about atmospheric to 50 pounds per square inch, for example, about 15 pounds per square inch. Steam from line 14 may be heated with the oil or separately heated in coil 15 and injected into coils 12 or into the transfer line 16, the amount of steam ranging from about 2 to 20%, for example about 10%, by weight based on oil charge.

Hot regenerated catalyst from line 17 is introduced through a slide valve or star feeder 18 into a catalyst suspension zone 19 wherein the catalyst is suspended in gases or vapors from line 16 and is conveyed by said gases or vapors into reaction chamber 20. The weight ratio of regenerated catalyst to oil introduced into the reactor may be about 1:1 to about 16:1 for example about 4:1. The temperature of the catalyst from standpipe 17 may be 900 to about 1100° F., for example about 980 to 1000° F. The suspended catalyst stream is, therefore, introduced at the base of the reactor at a temperature of about 850 to 1050° F., for example at about 950° F. The average vapor velocity in the reactor may range from about 0.3 to 3 feet per second, for example may be about 1.5 feet per second and the pressure at this point may be from atmospheric to 50 pounds, for example about 10 or 12 pounds per square inch.

The catalyst may be of the silica-alumina or silica-magnesia type and may be prepared by the acid treating of natural clays, such as bentonite, or by synthetically preparing a powdered silica-alumina or silica-magnesia mixture. An excellent catalyst may be prepared by ball-milling silica hydrogel with alumina or magnesia using about 2 to 30%, for example about 15 or 20%, of alumina or magnesia. The ball-milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is preferably boiled for an hour or two with an excess of dilute ammonium hydroxide solution before washing, after which it is dried and heated as in the previous example. The silica-alumina catalyst may be rendered more stable at high temperatures by the addition thereto of zirconia in either smaller or larger amounts than alumina. The ball-milled silica-magnesia catalyst may be improved by preheating the magnesia with a thorium nitrate solution so that the finished catalyst may, for instance, have the following composition:

| | Per cent |
|---|---|
| Silica | 66 |
| Magnesia | 27 |
| Thoria | 7 |

No invention is claimed in the composition or preparation of catalyst per se and no further description of the catalyst is, therefore, necessary.

The catalyst in this specific example is in powdered form with a particle size of about 1 to 100 microns, i. e., with about 50% of the catalyst passing a 400 mesh screen. The invention is applicable, however, to other catalyst sizes provided only that the catalyst be of such size and density that it may be aerated and handled as a fluid in the manner herein described. Higher gas or vapor velocities may be required for coarser catalyst particles, but these particles may be of such size as to be retained on a 400, 300, 200, 100 or even 50 mesh screen.

The density of the catalyst particles per se may be as high as 160 pounds per cubic foot but the bulk density of catalyst which has settled for 5 or 10 minutes will usually be from 25 to 40 pounds per cubic foot. With slight aeration, i. e., with vapor velocities of about .05 to .5 feet per second, the bulk density 1–100 micron catalyst will be about 20 to 30 pounds per cubic foot. With vapor velocities of about 1 to 3 feet per second the catalyst is in the dense turbulent suspended catalyst phase and the bulk density of such catalyst may be about 10 to 20 pounds, for example, about 15 pounds to 18 pounds per cubic foot. With high vapor velocities, i. e., the vapor velocities employed in transfer lines, the catalyst is in a light dispersed phase, the density of which is in most cases less than about 1 or 2 pounds per cubic foot. Similarly, the light dispersed catalyst phase in the top of the reactors may have a density of about 50 or 100 grains to 5 pounds per cubic foot. The light dispersed catalyst phase is at least 5, and is preferably at least 10, pounds per cubic foot lighter than the dense turbulent suspended catalyst phase. This latter phase is usually maintained lighter, and preferably at least 5 pounds, per cubic foot lighter than the aerated catalyst in the standpipe in order to avoid excessive length of standpipe.

In the specific example herein described, the reactor is a cylindrically shaped vessel about 12 or 13 feet in diameter and about 25 to 40 feet in height. It should be understood, of course, that the size and shape of the reactor may be varied within fairly wide limits and will be dependent upon the particular catalyst employed, the operating conditions for which it is designed and the results which it is to accomplish. The base of the reactor may be a simple conical member with about a 60° slope. I may, if desired, employ distributing means at the base of the reactor in order to insure uniform catalyst distribution and to prevent a chimneying effect.

The average catalyst residence time in the reactor may range from about 1 to 60 minutes or more and may, for example, be about 8 minutes. The average vapor residence time in the reactor may be about 5 to 50, usually about 10 to 20 seconds. Due to the increase in volume which is produced by the cracking of the heavier hydrocarbons the vapor velocity at the top of the reactor will be slightly greater than at the bottom of the reactor.

The top of the reactor may be enlarged to decrease the vertical gas or vapor velocities therein and to permit settling of the catalyst out of the upper light dispersed phase into the dense, turbulent suspended catalyst phase which is maintained in the main part of the reactor. This enlarged zone may be about 16 feet in diameter and about 15 to 30 feet in height. While a slight restriction may be interposed between the main part of the reactor and this upper enlarged zone, I prefer to avoid any restriction which would increase the vertical vapor velocities to an extent sufficient to cause the catalyst to enter the upper enlarged section as a dispersed phase. Catalyst leaves the reactor through an overflow or draw-off line, as will be hereinafter described, and all but about .01 to .02% of the catalyst which tends to leave the top of the reactor is knocked back into the dense turbulent suspended catalyst zone by cyclone separators or other suitable knock-back means.

The remaining unseparated catalyst which may amount to only about .01 to .02% of the total amount charged is carried with reaction vapors through line 24 to the lower part of fractionating column 25 and this residual catalyst material is withdrawn from the base of the fractionating column with a small amount of heavy cycle oil and either withdrawn from the system through line 26 or recycled through line 27. A heavy gas oil side stream may be withdrawn through line 28 and a light gas oil side stream through line 29.

Gases (including steam) and gasoline may be taken overhead through line 30, through cooler 31 to receiver 32, which is designed for the separate removal of condensed water, condensed oil and uncondensed gases. The water separates as a lower layer and is withdrawn through line 33. The gases are compressed by compressor 34 to a pressure of about 135 pounds per square inch and the liquids are pumped by pump 35 to a corresponding pressure after which the mixture of hydrocarbons is introduced by line 36 into a pressure fractionation system 37 which is diagrammatically represented as a single column with a heating means 38 at its base and a reflux means 39 at its top. A $C_2$ hydrocarbon and lighter gas fraction may be removed through line 40, a $C_3$–$C_4$ fraction through line 41, a light naphtha fraction through line 42 and a heavy naphtha fraction or 400° F. end point gasoline through line 43. It should be understood that this recovery system is shown diagrammatically and that suitable stills, absorbers, stabilizers, etc. will be used in actual practice to effect this fractionation.

Spent catalyst is withdrawn directly from the dense turbulent suspended catalyst phase in reactor 20 through overflow pipe or standpipe 44. The top of this pipe may communicate with the reactor at about the point of enlargement or increased diameter. If a lower dense phase level in the reactor is desired I may open valve 45 and thus lower the effective height of the overflow pipe 44. If a still lower level is desired I may open valve 46. By changing the level of the dense turbulent suspended catalyst phase in reactor 20 I may change the amount of catalyst in the reactor and thus control conversion in the reactor.

Overflow pipe or standpipe 44 is of sufficient diameter to permit stripping of the catalyst as well as aeration. Stripping steam may be introduced at the base of this standpipe through line 17 in such amounts that the vertical velocity of the stripping gas in standpipe 44 will not exceed about 0.5 foot per second. Additional stripping steam may be introduced by line 72a into the enlarged upper part of standpipe 44. This stripping of the catalyst in the standpipe is an important feature of my invention because without such stripping about 30 to 40 barrels per hour of valuable oil will be charged to the regenerator thus wasting the valuable product and placing an inordinately heavy heat transfer load on the regenerator.

The aerated and stripped catalyst is introduced from the base of standpipe 44 through valve 47 into suspension zone 48 wherein it is suspended in regeneration gases produced from air introduced from line 49. The suspended catalyst is then introduced into the base of regenerator 50 which may be a hollow cylindrical vessel similar to reactor 20 but of larger size, the diameter of the regenerator being, for example, about 18 feet and its height about 50 to 70 feet. About 600,000 pounds per hour of catalyst is thus introduced into the regenerator along with about 10,000 to 12,000 pounds per hour of carbonaceous material. For the regeneration of this catalyst it may be necessary to introduce about 70,000 to 75,000 pounds per hour of air. The catalyst in standpipe 44 may be at a temperature of about 900° F. The pressure at the base of the regenerator may be about 13 to 16 pounds per square inch. The average vertical gas velocity in the regenerator may be about 1.5 to 2 feet per second more or less, and the temperature throughout the regenerator may be about 1000° F.

At the top of the regenerator I may provide an enlarged section 51 which may be about 22 feet in diameter and about 15 to 30 feet high and which may contain centrifugal separation means which will be hereinafter described. Here again I prefer to avoid any restriction between the lower and the upper part of the regenerator, or at any rate to limit the amount of restriction so as to prevent any substantial increase in gas or vapor velocity at this point. I prefer to actually decrease vapor velocity at this point in order that catalyst may settle out of the light dispersed phase in the enlarged section at the top of the reactor and drop back into the dense turbulent suspended catalyst phase.

To effect substantially complete recovery of catalyst from regeneration gases I employ a system of cyclone separators mounted at the top of the reactor either on the outside or the inside thereof but preferably on the inside. Any type of centrifugal or cyclone separators may be employed for this purpose and the separators may be connected in parallel or in series or in multistage groups. In Figure 1 I have illustrated a multi-stage system entirely within the upper enlarged portion of the reactor. In actual practice I prefer to mount the cyclones around the periphery of this upper section in order to provide easy access to the standpipes leading therefrom for control or repair of the same and I prefer to employ four sets of primary, secondary and tertiary cyclones.

Most of the catalyst separates from the ascending gases in the upper enlarged regenerator section 51 so that in the inlet to the primary separators the gases may contain about 400 grains of catalyst per cubic foot. About 185 cubic feet per second of such gas may be picked up by each of the four primary cyclone inlets represented in the drawing by line 52. Upwards of 30,000 pounds per hour of catalyst may be separated in each of these primary cyclones 53 and returned to a point underneath the level of the dense turbulent suspended catalyst in regenerator 50 by dip legs 54. With a pressure of about 8 pounds per square inch in the settling chamber, the pressure in cyclones 53 may be about 7½ pounds so that the settled catalyst layer in dip legs 54 will be at a sufficiently higher level than the level of the dense turbulent suspended catalyst phase to compensate for this pressure differential.

The gases leaving the primary cyclones 53 are passed through lines 55 and tangentially introduced into secondary cyclones 56 which may operate at a pressure of about 7 pounds per square inch. Here the introduced gases may contain about 75 grains of catalyst per cubic foot and each secondary cyclone may recover upwards of 4,000 pounds per hour of catalyst which is returned to a point below the level of the dense turbulent suspended catalyst zone in the regenerator by means of dip legs 57. The level of settled catalyst in dip legs 57 will be even higher than the level in dip legs 54 because of the lower pressure in cyclones 56.

Gases from cyclones 56 are then introduced by lines 58 into tertiary cyclone separators 59 which may operate at about 6½ pounds per square inch. Here entering gases may contain about 35 grains of catalyst per cubic foot and from each of these separators upwards of 1200 pounds of catalyst per hour may be returned to a point below the level of the dense turbulent suspended catalyst in reactor 50 through dip legs 60. The catalyst level in dip legs 60 will be still higher than the level in dip legs 57, the head of catalyst in each of the dip legs compensating for the difference between the pressures in the respective cyclone separators and the pressure in the top of the regenerator.

It is very important to have each of the dip legs extend well below the level of the dense phase or settled catalyst in order that the settled catalyst may form a seal for said dip legs. Gooseneck valves or other types of seals may be employed but I prefer to effect the sealing of the dip legs by having them extend well below the level of the dense phase or settled catalyst. A small amount of gas may be permitted to pass upwardly through the dip legs for effecting aeration but the amount of such aeration gas must be carefully controlled and the head of catalyst at the bottom of the dip legs must exceed the pressure in the regenerator at the point of discharge.

In order to insure the proper function of the dip legs I provide each of them with a valve 61 which is preferably at a point near their respective bases. The valve stems may extend through the walls of chamber 50 for external control by manual or automatic means. Aeration steam may be introduced into the dip legs immediately above and below valves 61 through lines 62 and 63 respectively. It should be understood that each dip leg of each cyclone is thus provided with a suitable externally controlled valve and stem connection. At the beginning of the operation the valves may be substantially closed so that the necessary head of catalyst in the dip leg may be built up. Then, when the lower ends of the dip legs are properly sealed by dense phase or settled catalyst in chamber 50, valves 61 may be opened to such an extent that settled catalyst will flow downwardly in the dip legs until the pressure drop across the respective cyclones is balanced by the head of catalyst in the dip legs.

If at any time a dip leg should become plugged or should lose its necessary catalyst head, that fact will be evidenced by a gauge indicating the pressure in the particular cyclone or by an undue amount of catalyst leaving the separation system through line 64. In this event valves 61 may be closed and any or all of the dip legs may be blown free of catalyst by the introduction of steam through lines 62 and 63. Operation may then be resumed in the manner above described.

When the catalyst material is relatively non-uniform in particle size, i. e., when it contains a considerable amount of material of about 1 to 20 microns in diameter and a considerable portion of material of about 80 to 100 microns, there may be considerable classification of the catalyst in the settling zones above the reactor and the regenerator, respectively. In other words, the catalyst knocked back by the cyclone separators may consist almost entirely of fine material or may at least contain such a preponderance of fine material as to have a marked effect on its density in a settled or aerated phase in which it exists in the cyclone dip legs. Thus while dense aerated catalyst of about 1 to 100 micron particle size has a bulk density in settled aerated condition of about 20 to 30 pounds per cubic foot, the settled aerated catalyst fines in the cyclone dip legs may have a bulk density of only about 10 to 15 pounds per cubic foot. In such cases the cyclone dip legs should only extend below the level of the dense turbulent suspended catalyst phase in the reactors for a sufficient distance to insure the necessary seal. The lower ends of the dip legs should terminate at a higher point in the reactor and the regenerator than shown by Figure 1 and their extension into the dense turbulent suspended catalyst phase should be more nearly as illustrated in Figures 2 and 3. In any case, the cyclones should be mounted sufficiently high in the settling zone so that the dip legs can be of sufficient length to provide the necessary pressure differential.

When the catalyst particles are of relatively uniform particle size so that the catalyst knocked back by the cyclones is of approximately the same particle size as the catalyst drawn directly from the dense turbulent suspended catalyst zone, the cyclone dip legs may extend lower in the reactor or regenerator and, in fact, may terminate near the base of such reactors as illustrated in Figures 4 and 6. In this case the density of the settled and aerated catalyst in the cyclone dip legs will be equal to or greater than the density of the catalyst in the dense turbulent suspended catalyst zone.

Gases may leave tertiary cyclones 59 through line 64 which leads to heat exchanger 65 or other suitable device for recovering energy from the regeneration gases. The cooled gases may leave the heat exchanger at about atmospheric pressure and then be passed through a Cottrell precipitator 66 for the removal of any fines that may still be retained therein. The gases which leave the Cottrell precipitator through line 67 may be practically denuded of catalyst. The fines recovered from line 68 may be mixed with coarser catalyst and returned to the system or may be reworked or reconverted by physical or mechanical means into catalyst of more desirable particle size.

While the cyclone arrangement has been described in connection with the regenerator system it should be understood that exactly the same cyclone arrangement may likewise be employed in the reactor 20. Unless the context of this specification and the appended claims requires a different interpretation, the term "reactor" is hereby defined as including both the conversion reactor 20 and the regeneration reactor 50. Internal cyclones may be used in both of these reactors as hereinabove described.

My invention is not limited, however, to the use of internal cyclones and it should be understood that some or all of the cyclones may be externally mounted at the top of a reactor. When externally mounted the dip legs from the cyclones may extend through the reactor wall to a point below the level of dense phase or settled catalyst in the reactor. Alternatively the separated catalyst from two or more cyclones may be collected in a collecting tank or standpipe and the catalyst from such collector may be returned to the dense phase in the reactor either directly or by means of an injecting gas. In any case it is essential that catalyst be knocked back from gases or vapors leaving the reactor in order to maintain the desired amount of catalyst in the reactor.

In order to prevent the development of excessively high temperatures in the regenerator it is necessary to abstract heat therefrom, such heat may be abstracted by internal cooling with a Stirling type boiler which is characterized by upper and lower headers with substantially vertical tubes connected thereto and with means for introducing water into the lower header, withdrawing steam from the upper header at desired pressure and maintaining the desired water level in the tubes. In order to avoid any interference with the behavior of the dense turbulent suspended catalyst phase I may effect the cooling of the regenerator by recycling about 1,500,000 to 2,000,000 pounds per hour of regenerated catalyst through an external cooler. Thus dense phase catalyst may be withdrawn from a point near the top of the regenerator through conduit 69, passed downwardly through heat exchanger 70 and then introduced by conduit 71 directly into the lower part of the regenerator. The amount of recycled catalyst may be controlled by valve 72 which may be operated by manual or automatic means responsive to the temperature conditions in the regenerator. Steam or other aerating gas may be introduced at the base of conduit 71 through line 73 so that the catalyst will be maintained in fluent liquid-like form in the heat exchanger tubes and in the conduits leading thereto and therefrom. Cooling fluid may be introduced through line 74 and withdrawn from the exchanger through line 75. The catalyst flows through the tubes of heat exchanger 70, the ends of which are preferably designed for streamlined flow and for preventing dead spots for catalyst accumulation. The temperature control may be effected either by regulating the amount and temperature of cooling fluid introduced through line 74 or by regulating the amount of regenerated catalyst which is recycled, or both. When regenerating about 600,000 pounds per hour of spent catalyst I may recycle about 1,500,000 to 2,000,000 pounds per hour of regenerated catalyst and thus cool this catalyst to a temperature of about 840-850° F. before returning it to the dense turbulent suspended catalyst phase in the lower part of the regenerator.

The catalyst recycling system hereinabove described functions by virtue of the difference in the catalyst density in the reactor (about 15 or 20 pounds per cubic foot) and the density of aerated catalyst in cooling systems 69, 70 and 71 (about 21 to 30 pounds per cubic foot). It should be noted that indirect heat transfer is employed in the exchanger in order to protect the catalyst from impurities which would inevitably be deposited thereon if this recycled catalyst were in direct contact with a cooling fluid. I prefer to employ a constant rate of catalyst recycle and to regulate the heat removal by raising or lowering the level of the water around the tubes of the heat exchanger.

Regenerated catalyst is withdrawn directly from the dense turbulent suspended catalyst phase in regenerator 50 by means of overflow pipe or standpipe 17. Here again it is essential that the pipe be of sufficient diameter to permit stripping as well as aeration of the withdrawn catalyst and the pipe is preferably provided with an upper enlarged section for insuring adequate stripping. Standpipes 17 and 44 may be about 25 to 30 inches in diameter and may be about 65 to 70 or more feet high. Both of these standpipes act as stripping columns, steam being introduced at the base thereof through lines 76 and 77 and to the enlarged upper parts thereof through lines 76a and 72a respectively.

It has already been pointed out that the amount of catalyst in the reactor 20 may be controlled by raising or lowering the level of the dense turbulent suspended catalyst phase. The amount of catalyst in the regenerator may in turn be regulated by catalyst inventory in the system. Inevitably a small amount of catalyst is lost from the system with regeneration gases, etc. and make-up catalyst from hopper 78 is therefore constantly introduced into the system through line 79 in amounts regulated by valve 80, the make-up catalyst being aerated by suitable gas introduced through line 81. If the dense phase catalyst level in the regenerator tends to fall I simply increase catalyst inventory by the addition of fresh catalyst from hopper 78.

The fresh catalyst may be admixed with catalyst fines at its point of introduction (not shown) and line 79 may thus lead to the base of the electrostatic precipitator 66 or to a hopper below said precipitator. Since the amount of introduced fresh catalyst is relatively small and since it is desired to admix precipitated fines with larger amounts of coarser catalyst material, regenerated catalyst from overflow pipe 17' may likewise be admixed with these catalyst fines. The amount of catalyst introduced from pipe 17' is regulated by valve 18' and catalyst in this standpipe or overflow pipe may be stripped with steam introduced through line 76'. The mixture of fresh catalyst, regenerated catalyst and precipitated catalyst may be recycled through line 68 to the upper part of the regenerator by means of a suitable carrier gas such as steam.

In some cases, particularly when reduced crude is employed as a charging stock, there may be a tendency for carbon to deposit on pipe still tubes. The solid catalyst particles recycled through line 27 will help to keep the heater coils free from carbon deposits but in some cases it may be necessary or desirable to add additional amounts of catalyst to this recycled stream or to the feed stock stream. Thus overflow pipe 90 may carry spent catalyst directly from the dense phase in reactor 20 to the base of fractionator 25 the catalyst in pipe 90 being aerated by steam introduced by line 91 and the amount of catalyst which is thus transferred to the recycle oil being regulated by valve 92. Stripping, of course, is not so essential when catalyst is introduced from the reactor but it is very essential when catalyst is introduced from the regenerator. The amount of catalyst which is passed as a slurry through the heater coils should be sufficient to keep these coils free from deposited carbon and such amounts will, of course, vary with particular charging stocks.

It will be understood, of course, that suitable expansion joints will be provided in the various standpipes and other lines where expansion problems are encountered. This expansion problem will be minimized by employing concentric internal standpipes as will now be described in connection with Figure 2.

In Figure 2 I have illustrated a modification of my invention wherein internal standpipes are mounted at the center of both reactors, the reactors in effect being concentrically mounted around the upper part of standpipes 17a and 44a, respectively. In this figure I have illustrated one cyclone as being internally mounted and another cyclone as being externally mounted but it should be understood that a plurality of cyclones may be mounted in series or in parallel or both, either internally or externally or both internally and externally. In the reactor 20 standpipe 44a is provided at its upper end with a telescopic section 45a which may be moved upwardly or downwardly by a rack and pinion mechanism 46a which may be manually or automatically operated from a point outside of the reactor. The movement of upper pipe section 45a upwardly and downwardly serves the same function as the opening of valves 45 and 46 in the modification illustrated in Figure 1.

In Figure 3 I have illustrated a modification wherein the overflow pipe or standpipe 44b extends directly from a dense phase zone in the top of reactor 20 to a dense phase zone near the base of regenerator 50. In this modification pipe 44b serves as a stripper for the removal of oil from catalyst which is charged to the regenerator. It should be particularly noted that the catalyst does not pass through a light dispersed phase in its passage from reactor to regenerator. It is withdrawn from the reactor in dense phase condition. It is stripped in dense phase condition and it is introduced into dense turbulent suspended catalyst phase of the regenerator, the catalyst at all times being in dense phase condition. For such an operation the pressure in the regenerator at the point of catalyst introduction should be at least 1 to 3 pounds lower than the pressure head of catalyst in pipe 44b at this point. Valve 47b is preferably a pressure operated valve which automatically closes when the pressure at the bottom of pipe 44b is not at least 1 pound greater than the pressure at this point in the regenerator. In order to insure the necessary pressure differentials it is desirable in this system to operate with reactor 20 at a higher level or a higher pressure than regenerator 50.

In Figure 4 I have illustrated still another modification wherein the transfer from each reactor to the other reactor is entirely under dense phase conditions. In such a system the reactor and the regenerator must be of substantially equivalent height and the difference between the head of catalyst in the reactors and in the standpipes must be sufficient to supply the necessary pressure differential at the point of catalyst introduction in each case. Thus, for example, each chamber may be about 50 feet high and each standpipe may have an effective height of about 40 feet. With a catalyst density in the reactors of about 15 pounds per cubic foot and a catalyst density in the standpipes of about 25 pounds per cubic foot I may obtain a pressure differential of about 2½ to 3 pounds per square inch at the point of catalyst discharge into the base of each reactor. Thus valves 47c and 18c may be automatically closed when the pressure in the base of the respective standpipes falls below a value which is 1½ to 2 pounds per square inch greater than the pressure in reactors 50c and 20c, respectively. In this system it is extremely important to prevent air from passing upwardly through pipe 44c into the reactor and to prevent oil vapors from passing upwardly through line 17c into the regenerator. To further insure against such a possibility I prefer to introduce the air and the oil vapors, respectively, at a higher point in their respective reactors than the point at which catalyst is introduced to maintain the catalyst in the base of each reactor in aerated form so that it will serve as a liquid-like seal of the lower ends of pipes 44c and 17c, respectively. The dip legs from the cyclones may likewise extend to a point below the level of this aerated catalyst which is underneath the dense turbulent suspended catalyst phase. The arrangement of the lower ends of such dip legs and the sealing, aerating and regulating means therefor are illustrated in Figures 5 and 6. Beneath each dip leg I may provide a cone-shaped closure member 82 supported on a hollow shaft 83 which extends through stuffing box 84 to external control means 85. Steam or other aerating gas may be introduced through line 86 and discharged through ports in the top of closure member 82 so that when this member is in its upper position against the low end of the dip leg the steam may be used for aerating or blowing catalyst out of the dip leg. When closure member 82 is in its lower position the steam may disperse catalyst from the base of the dip leg into the reactor. Aeration steam may be introduced into the bottom of reactor 20 or through line 87 and into the bottom of reactor 50c through line 88.

From the above detailed description many other modifications and alternate forms of the invention will be apparent to those skilled in the art. Thus line 44b of Figure 3 may extend to a point adjacent the base of reactor 50 and the air instead of being introduced through line 49b at the very bottom of the reactor may be introduced at an upper point as illustrated by line 49c of Figure 4. Also, instead of transferring dense phase catalyst directly from reactor to regenerator as illustrated in Figure 3, I may transfer dense phase catalyst directly from regenerator to reactor. The valve closure illustrated in Figure 6 may be employed to seal dip legs in all of the modifications herein described and also to seal the lower ends of conduits 7Ic, 44c, 17c, etc. While I have described specific operating conditions for a specific stock in a plant of given size it should be understood that my invention is not limited to such operating details and those skilled in the art will be enabled from the above description to determine the size of equipment, operating conditions, etc. that are required for plants of various size and for use on various stocks.

I claim:

1. In a powdered catalyst hydrocarbon contacting system wherein hydrocarbon vapors are contacted with catalyst in a first dense turbulent suspended catalyst phase and wherein the catalyst is regenerated in a second dense turbulent suspended catalyst phase, the method of controlling conversion and regeneration in the system which comprises regulating the level of the first dense turbulent suspended catalyst phase by controlling the level at which catalyst is removed therefrom, regulating the introduced catalyst-to-oil ratio to control catalyst residence time in the reactor, and regulating the level in said second dense turbulent suspended catalyst phase by controlling the amount of new catalyst added to the system.

2. A system for treating gases or vapors with finely divided solids which system comprises a vertical contacting chamber, means for introducing gases or vapors at a low point in said contacting chamber and for introducing finely divided solids thereto whereby said solids may be suspended in an upflowing gas or vapor stream in said chamber and whereby a dense turbulent phase of suspended solids may be maintained in the lower part of said chamber, a cyclone separator mounted inside of said chamber and in the upper part thereof, means for introducing gases and vapors from the upper part of said chamber into said cyclone separator, a dip leg extending from said cyclone separator into the dense turbulent phase of suspended solids in the lower part of said chamber, said cyclone separator being mounted high enough in the chamber to provide a head of separated solids in the dip leg sufficient to balance the difference between the pressure in the upper part of the contacting chamber and the pressure in the cyclone separator, means for withdrawing gases and vapors from said cyclone separator to a point outside of said chamber and separate means for withdrawing dense phase solids directly from the dense phase of suspended solids in the contacting zone.

3. The system of claim 2 wherein the upper part of said chamber is of sufficiently larger effective cross-sectional area than the lower part thereof so that the bulk of finely divided solids carried into the upper part of the chamber by the upflowing gases or vapors may separate therefrom by gravity to the dense suspended solids phase in the lower part of the chamber and so that the load on the cyclone separator may be substantially reduced.

4. The system of claim 2 which includes a heat exchanger constructed and arranged for cooling dense phase solids.

5. The method of operating a powdered catalyst conversion system which comprises introducing powdered catalyst into an upflowing gas or vapor contacting zone, passing gases or vapors upwardly through said zone at such a rate as to produce a dense turbulent phase of suspended catalyst and a light dispersed catalyst phase above said dense phase, continuously separating catalyst from said light dispersed phase and returning said separated catalyst to said dense phase whereby said dispersed phase is substantially denuded of catalyst material, withdrawing denuded gases or vapors from the light dispersed phase, separately withdrawing catalyst from the dense phase below the upper level thereof passing the catalyst thus directly withdrawn from the dense phase through a cooling zone and returning the cooled catalyst from said cooling zone to a lower part of said dense phase.

6. The method of claim 5 wherein the dense phase catalyst which is withdrawn from the upper part of the dense turbulent suspended catalyst phase, passed through the cooling zone and returned to the lower part of the dense suspended catalyst phase is transferred solely by gravity and without passing through a dilute phase.

7. The method of claim 5 wherein carbonaceous deposits are burned from the catalyst in the contacting zone and wherein air is introduced into said zone to supply the upflowing gas.

8. A powdered catalyst conversion system which comprises an upflow reactor having a top section of greater effective cross-sectional area in unrestricted communication therewith whereby there is a decrease in the vertical velocity of upflowing gases or vapors as they pass from the lower part of said reactor to said top section, a centrifugal separator mounted inside the top section of the reactor and having an inlet communicating with the space in said top section, means for maintaining separated catalyst particles out of contact with upflowing gases while returning said particles from said separator directly to a lower point inside of the reactor, and separate means for withdrawing dense phase catalyst from the reactor.

9. The method of operating a powdered solids contacting system which method comprises operating an upflow contacting zone under such conditions as to maintain a dense aerated solids phase at the base of said zone, a dense turbulent suspended solids phase above said aerated solids phase and throughout a substantial part of said zone and a light dispersed solids phase above said dense turbulent suspended solids phase, introducing gases or vapors at the bottom of the dense turbulent suspended solids phase, introducing solids from said aerated solids phase into said dense suspended solids phase, downwardly withdrawing dense phase solids directly from the dense turbulent solids phase and returning solids from the light dispersed solids phase to said dense turbulent suspended solids phase.

10. The method of operating a system for treating gases or vapors with powdered solids which method comprises introducing gases or vapors at a low point in a vertical contacting zone, introducing finely divided solids into said zone whereby said solids may be suspended in the upflowing gas or vapor stream therein, employing such upward vertical velocity of the gases or vapors in said zone as to maintain a dense turbulent suspended solids phase in the lower part of said zone and a light dispersed solids phase in the upper part of said zone, centrifugally separating solids from gases or vapors in the upper part of said zone, returning said centrifugally separated solids as a downwardly moving column into the dense turbulent suspended solids phase in the lower part of said zone the height of said column balancing the pressure drop in the centrifugal separation step, withdrawing denuded gases or vapors from centrifugally separated solids and separately withdrawing dense phase solids as a downwardly moving column directly from the dense turbulent suspended solids phase in said contacting zone at substantially the same rate as the rate at which finely divided solids are introduced into said zone.

11. The method of operating a conversion process employing catalyst solids of small particle size which method comprises continuously introducing a gasiform fluid at a low point in a vertical contacting zone, continuously introducing catalyst solids of small particle size into said zone whereby said solids are suspended in the upflowing gasiform stream therein, employing such upward vertical velocity of the gasiform stream in said zone as to maintain a dense turbulent suspended catalyst phase in said zone and a light dispersed catalyst phase in said zone above said dense phase, returning under the influence of gravity to said dense phase at least a portion of catalyst carried therefrom by the upflowing gasiform stream into said dispersed phase, centrifugally separating another portion of the catalyst solids from the dispersed phase at a point within the contacting zone but at a higher level than the upper level of said dense phase, downwardly withdrawing centrifugally separated solids as a substantially vertical column directly to said dense phase at a point sufficiently below the upper level thereof to provide a seal, said downwardly moving centrifugally separated solids providing the necessary pressure differential to balance pressure drop in the centrifugal separation step, withdrawing catalyst solids as a downwardly moving aerated solids column directly from the dense turbulent suspended catalyst phase in the contacting zone at a point below the upper level of said dense phase and utilizing the pressure at the base of said last-named column to introduce solids therefrom into a fluid stream for carrying said solids to an elevation which is higher than the base of said column.

12. The method of operating a powdered catalyst conversion system which comprises introducing powdered catalyst into an upflowing gas or vapor contacting zone, passing gases or vapors upwardly through said zone at such a rate as to produce a dense turbulent phase of suspended catalyst and a light dispersed catalyst phase above said dense phase, continuously withdrawing gases or vapors from said light dispersed phase and from said contacting zone, separating catalyst from said gases or vapors being withdrawn whereby they are substantially denuded of catalyst material, returning said separated catalyst to the dense phase, separately withdrawing catalyst from the dense phase below the upper level thereof, passing the catalyst thus directly withdrawn from the dense phase through a cooling zone and returning the cooled catalyst from said cooling zone to a lower part of said dense phase.

13. The method of effecting catalytic conversion of a gasiform stream with solid catalyst of small particle size which method comprises introducing said stream at a low point in a vertical conversion zone, introducing said catalyst into the conversion zone whereby said catalyst is suspended in the upflowing stream therein, employing such upward vertical stream velocity in said conversion zone as to maintain a dense turbulent suspended catalyst phase in the lower part of said zone and a light dispersed catalyst phase in the upper part of said zone, centrifugally separating catalyst from the dispersed catalyst phase in the upper part of said zone, returning said centrifugally separated catalyst as a downwardly moving column into the dense turbulent suspended catalyst phase in the lower part of said zone, the height of said column balancing the pressure drop in the centrifugal separation step, withdrawing the gasiform stream from which catalyst has been centrifugally separated, and separately withdrawing dense phase catalyst as a downwardly moving column directly from the dense turbulent suspended catalyst phase in the conversion zone at substantially the same rate as the rate at which finely divided solids are introduced into said zone.

14. The method of contacting a gasiform stream with a solid catalyst of small particle size for effecting exothermic reaction which method comprises introducing said catalyst into a contacting zone, passing said gasiform stream upwardly through the lower part of said zone at such a rate as to produce a dense turbulent phase of suspended catalyst therein, passing said stream through the upper part of said zone at a rate which is sufficiently low to permit separation by gravity of most of the catalyst into said dense phase whereby a light dispersed catalyst phase is maintained above said dense phase in the contacting zone, centrifugally separating additional catalyst from the dispersed catalyst phase in the upper part of said zone, returning said centrifugally separated catalyst as a downwardly moving column into the dense turbulent catalyst phase, the height of said column balancing the pressure drop in the centrifugal separation step, withdrawing the stream from which catalyst has been centrifugally separated, separately withdrawing dense phase catalyst as a downwardly moving column directly form the dense turbulent suspended catalyst phase in the contacting zone and removing heat from the contacting zone at such a rate as to maintain a substantially constant temperature therein.

ROBERT C. GUNNESS.

(References on following page)

REFERENCES CITED

The following references are of record in the file of this patent:

UNITED STATES PATENTS

| Number | Name | Date |
|---|---|---|
| 1,799,858 | Miller | Apr. 7, 1931 |
| 1,845,058 | Pier | Feb. 16, 1932 |
| 1,983,943 | Odell | Dec. 11, 1934 |
| 1,984,380 | Odell | Dec. 18, 1934 |
| 2,039,904 | Hill | May 5, 1936 |
| 2,231,231 | Subkow | Feb. 11, 1941 |
| 2,231,424 | Huppke | Feb. 11, 1941 |
| 2,248,196 | Plummer | July 8, 1941 |
| 2,253,486 | Belchetz | Aug. 19, 1941 |
| 2,264,438 | Gaylor | Dec. 2, 1941 |

FOREIGN PATENTS

| Number | Country | Date |
|---|---|---|
| 533,037 | Germany | Sept 8, 1931 |

Certificate of Correction

Patent No. 2,488,031 — November 15, 1949

ROBERT C. GUNNESS

It is hereby certified that errors appear in the printed specification of the above numbered patent requiring correction as follows:

Column 1, line 14, for "July 3, 1942" read *July 3, 1941*; column 18, line 68, for the word "form" read *from*;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*